Feb. 26, 1952 J. P. MAYER 2,586,841
SPEED GOVERNOR FOR MOTORS
Filed April 1, 1948 2 SHEETS—SHEET 1
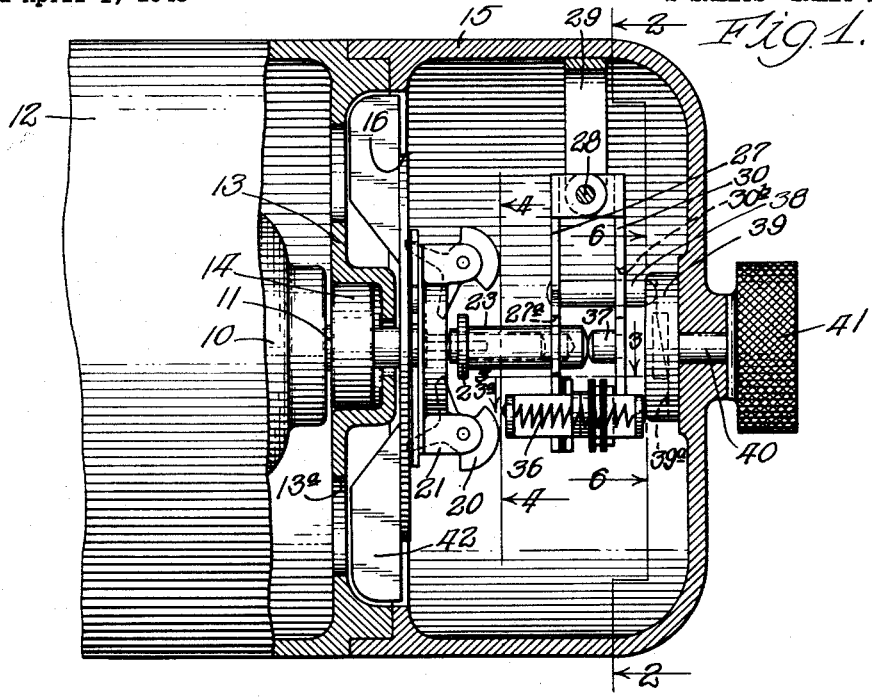
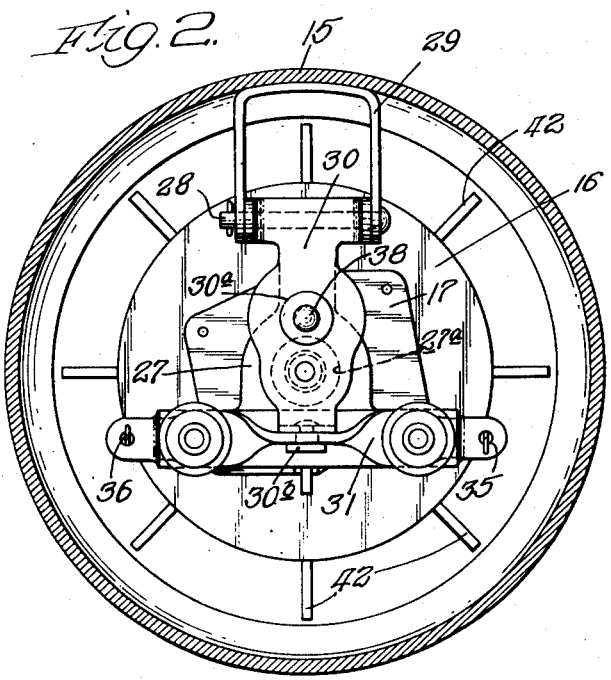
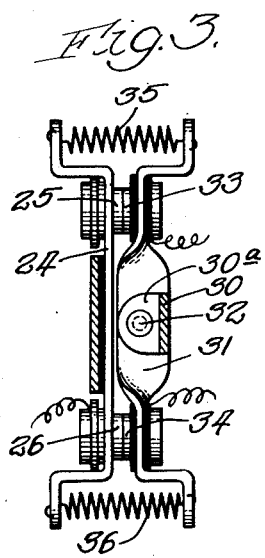
Inventor
Joseph P. Mayer,
By Chritton, Schroeder,
Merriam & Hofgren, Attys.

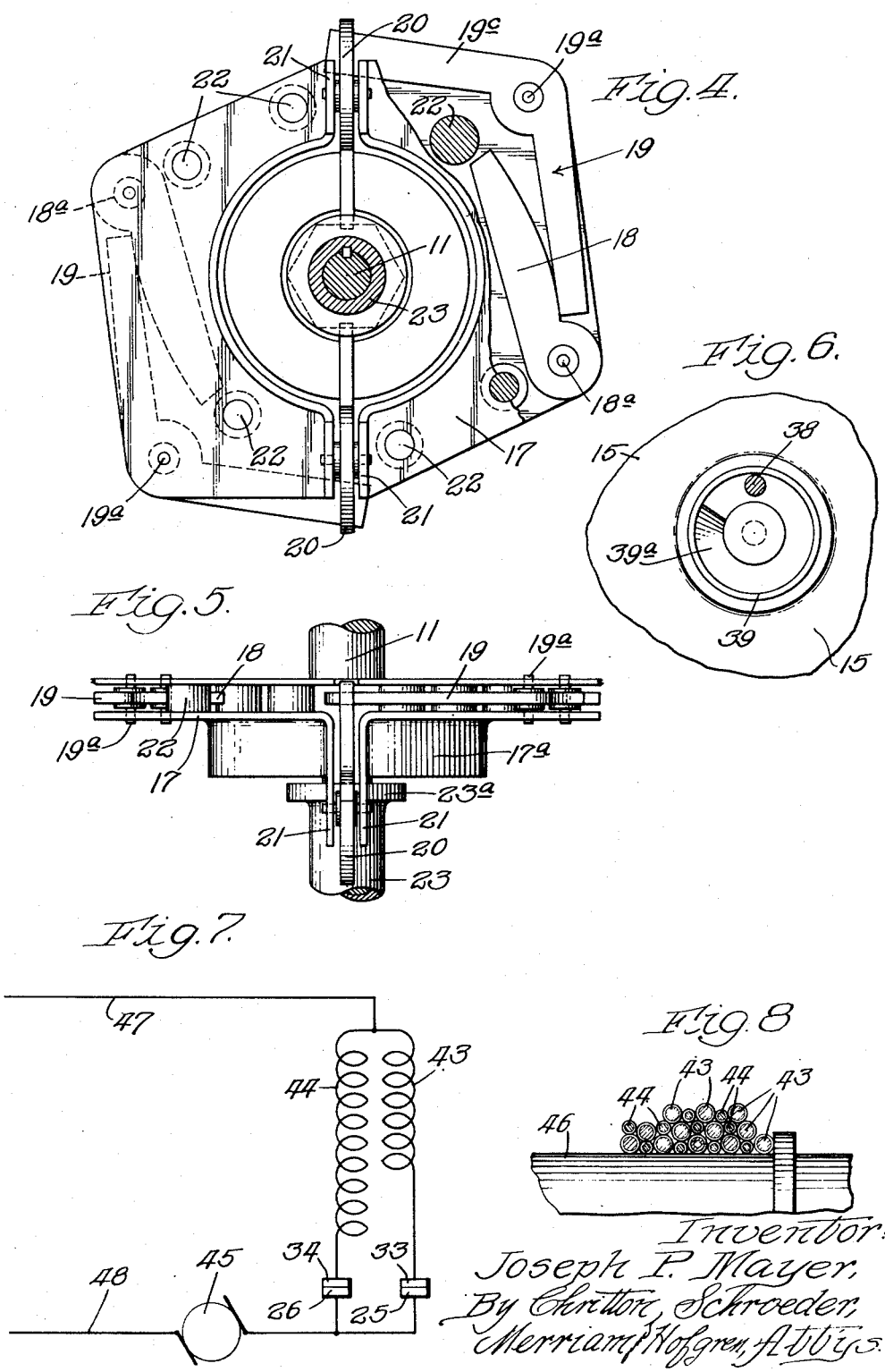

Patented Feb. 26, 1952

2,586,841

UNITED STATES PATENT OFFICE 2,586,841

SPEED GOVERNOR FOR MOTORS

Joseph P. Mayer, Chicago, Ill., assignor to Birtman Electric Company, a corporation of Illinois Application April 1, 1948, Serial No. 18,441

13 Claims. (Cl. 318—325)

This invention relates to a speed governor for a motor wherein the speed of the motor may be maintained substantially constant over a wide range of speeds, and relates particularly to such a speed governor wherein the motor will be controlled so as to accelerate and decelerate smoothly when it is operating under both load and no-load conditions.

The speed governor is of the same general type as described and claimed in the Charles H. Sparklin copending application Serial No. 580,114, filed February 28, 1945, now U. S. Patent 2,532,345, issued December 5, 1950. The speed governor described therein employed only one pair of contact points that were adapted to be arranged in series with the field of a motor in order to control the flow of electric current through the field. Although this speed governor having a single pair of contacts is very efficient mechanically for controlling the speed over an extremely wide range, it was found that the operation of the motor was somewhat jerky. This was caused by surges of magnetic impulses in the motor immediately after the contact points were closed. When the motor is subjected to full power by closing of the contacts, there is rapid acceleration until the speed of the motor increases to the point where the contact points are opened. When the contacts are opened, there is an immediate cutting off of power which results in a dropping off in speed. These factors combine to cause somewhat irregular and jerky operation in the motor. Although this is not harmful from a mechanical standpoint and does not decrease the efficiency of the motor and the speed governor, it does have a bad effect psychologically upon the operator of the motor. This bad psychological effect is particularly noticeable when the motor and speed governor are used with no loading on the motor such as occurs when demonstrating the motor and speed governor alone.

I have discovered that the jerky operation may be substantially reduced and in some cases eliminated by employing two pairs of contacts for governing the speed of the motor with one pair being slightly out of time phase with the other in its operation. When the motor starts operating and accelerates one pair of contacts opens first. This serves to break the electrical circuit to one of a pair of field coils arranged in parallel with each other, with one of the coils being in series with this one pair of contacts and an armature and the other coil being in series with the other pair of contacts and the armature. When the circuit to the one field coil is broken, the acceleration of the motor is slowed down and thus provides a "cushion" for the acceleration. As the other contacts are still closed, current continues to flow through the motor until the speed reaches a predetermined maximum where the other contacts open to break completely the electrical circuit to the motor. When the speed begins to drop, the other pair of contacts close so that the other field coil is placed in the circuit. This serves to slow the deceleration. If the speed falls still more, the one set of contacts close to place the one field coil in the circuit. When the motor is operating under no-load, the other pair of contacts, which are the last to open and the first to close, will ordinarily govern the operation of the motor after the maximum speed has been reached. When the motor is operating under load, however, the deceleration will ordinarily be so fast that both pairs of contacts will be used in the manner explained above.

The invention will be described as related to the embodiment shown in the accompanying drawings. Of the drawings: Fig. 1 is a partial elevation partially in section of a motor having a speed governor attached thereto with the speed governor being constructed according to the principles of this invention; Fig. 2 is a section taken along line 2—2 of Fig. 1; Fig. 3 is a section taken along line 3—3 of Fig. 1; Fig. 4 is a section taken along line 4—4 of Fig. 1; Fig. 5 is an end elevation of the structure shown in Fig. 4; Fig. 6 is a section taken along line 6—6 of Fig. 1; Fig. 7 is a wiring diagram of one embodiment of the invention; and Fig. 8 is an enlarged semi-diagrammatic fragmentary elevation showing the wires of the two field coils of the embodiment of Fig. 7 in cross-section.

In the apparatus shown in Figs. 1 to 6, inclusive, there is provided a motor 10 having a motor shaft 11 and a casing 12 arranged around the motor. The motor shaft 11 extends through an end wall 13 of the motor casing and is supported therein by a bearing 14. The motor shaft 11 extends through said wall 13 into a compartment formed by a casing 15 around the speed governor portion of the apparatus.

The speed governor comprises a relatively large flat plate 16 mounted on the shaft 11 within the casing 15 and arranged at substantially right angles to the shaft and fastened thereto, a second smaller plate 17 also fastened on the shaft 11 but parallel to and closely adjacent the first plate 16, a pair of arms 18 mounted between the plates 16 and 17 with each arm being mounted to rotate about a fulcrum 18a at one end thereof so as to be forced outwardly by centrifugal forces, a pair of first bell cranks 19 also mounted between the plates 16 and 17 with each being rotatable about a fulcrum 19a and a pair of second bell cranks 20 mounted on the smaller plate 17 at substantially right angles thereto. The arms 18 are mounted substantially diametrically opposite each other and each arm is adapted to contact one end 19b of the first bell crank 19. The other end 19c of each bell crank 19 extends to a position at least partially between the two plates 16 and 17. Each of the second bell cranks 20 are mounted between upstanding portions 21 provided on the smaller plate 17 and one end of each second bell crank is adapted to be located adjacent to and to be contacted by the inside surface of the end 19c of the first bell crank 19. The other end of the second bell crank extends toward the shaft 11. The smaller plate 17 is provided with an annular upstanding inner rim 17a that is substantially concentric with the shaft 11 and which serves to reinforce the plate 17. This inner rim 17a is formed by extensions of the upstanding portions 21, as shown in Figs. 1 and 4. The two plates 16 and 17 are held in spaced apart relationship by means of spaced posts 22 extending between the two plates.

There is provided a thimble 23 slidably mounted on the end of the shaft 11 and keyed thereto so as to rotate with the shaft 11. The inner end of the thimble 23 is provided with an annular rim portion 23a that is adapted to be contacted by the inner ends of the second bell cranks 20.

When the motor 10 is operating, the increasing speed of the motor tends to force the arms 18 outwardly due to centrifugal forces set up in these arms. The outward movement of these arms causes rotation of the first bell cranks 19 about their fulcrums 19a. As the ends 19b of the bell cranks 19 are moved outwardly, the opposite ends 19c are moved inwardly. These ends 19c contacting the second bell cranks 20 cause rotation thereof and thus result in movement of the inner ends of the second bell cranks 20 toward the outer end of the motor shaft 11. These ends of the second bell cranks 20 contact the rim 23a of the thimble 23 and move the thimble outwardly. The outward movement of the thimble 23 is used to open the motor circuit and thus stop the acceleration of the motor.

In order to cause the outward movement of the thimble 23 to break the electrical circuit to the motor, there is provided a contact arm 24 having two spaced apart contact points 25 and 26 mounted thereon and insulated therefrom. This contact arm 24 is mounted on one end of the base member 27 with the other end thereof being rotatably mounted about a pin 28 held by a bracket 29 attached to an inner surface of the casing 15. Also rotatably mounted about the pin 28 is a second arm 30 arranged substantially parallel to the base member 27. This second arm 30 extends down to a point adjacent the midpoint on the first arm 24. The lower end 30a of this second arm is turned inwardly toward the first arm 24 and has a third arm 31 mounted thereon by means of a pivot 32. The ends of the third arm 31 are twisted substantially ninety degrees, as shown in Fig. 3, so that these ends are substantially parallel to the first arm 24. These parallel ends are provided with two contact points 33 and 34 mounted thereon and insulated therefrom. One point 33 is arranged to contact one point 25 on the first arm 24 and the other point 34 is similarly arranged to contact the other point 26 on the first arm 24.

The extreme ends of the first 24 and second 31 arms are spaced outwardly from each other, as shown in Fig. 3. These ends, which are adjacent the one pair of contacts 25 and 33, are provided with a coil tension spring 35 extending therebetween. The other pair of cooperating points 26 and 34 are provided with a similar spring 36 of slightly greater strength.

The thimble 23 is arranged to extend through an opening 27a provided in the base member 27 and contact a button 37 mounted on the second arm 30, as shown in Fig. 1. In order that the position of the pairs of contact points relative to the end of the shaft 11 may be varied to vary the operating speed of the motor, there is provided a post 38 mounted on the base member 27 and extending through an opening 30b in the second arm 30. The outer end of the post is adapted to bear against a rotatable cam member 39 having a substantially circular cam surface 39a thereon. The cam member 39 is mounted on a shaft 40 which extends through the end of the casing 15 with the outer end of the shaft being provided with a knurled knob 41 for turning the shaft 40 and thereby rotating the cam member 39. As the outer end of the post 38 engages the cam surface 39a, the turning of the cam member 39 varies the position of the contact points relative to the end of the shaft. As the thimble 23 is forced outwardly by increases in speed of the motor, the particular speed desired can be regulated by selecting the desired position of the contact points relative to the end of the shaft. This operation is described in greater detail in the aforementioned Charles H. Sparklin copending application Serial No. 580,114.

In order to provide for ventilation of the motor and speed governor, spaced openings 13a are arranged in the end wall of the motor casing 12. Located adjacent these openings are spaced radial fan blades 42 mounted on the back surface of the relatively large rotatable plate 16.

In order to cushion the acceleration and deceleration of the motor and to reduce jerky operation, there is provided in the embodiment shown in Fig. 7 a pair of field coils 43 and 44 arranged in parallel to each other and in series with the armature 45. The first field coil 43 is arranged in series with the contacts 25 and 33 that are controlled by the light spring 35. The second field coil 44 is arranged in series with the pair of contacts 26 and 34 that are controlled by the relatively heavy spring 36. As is shown in the semi-diagrammatic view of Fig. 8, the windings of the field coils 43 and 44 are intermingled with each other in the motor. This arrangement is employed so that the field will not shift its location when the coils are placed in and removed from the electrical circuit. The field will merely vary in intensity. The windings of the field coils 43 and 44 are arranged on a base member 46 within the motor. The electrical circuit to the motor is completed by providing a lead wire 47 from one side of a source of electric power to the ends of the coils 43 and 44 opposite the contact points. The armature 45 is connected by means of another lead wire 48 to the other side of the source of power.

When both pairs of contacts 25 and 33 and 26 and 34 are closed, current flows through the coils 43 and 44 in parallel and these coils are so proportioned that the motor acts as an ordinary series motor with rapid acceleration. This arrangement is called a "strong" motor. When the speed of the motor has reached a point where the contacts 25 and 33 are opened, the first field coil 43 is immediately disconnected from the electrical circuit and the motor operates on the field coil 44 only until the predetermined speed that is determined by the setting of contacts 26 and 34 is reached. When the second field coil 44 only is in the circuit, the motor is a "weak" motor and acceleration is much slower. Because of this slow acceleration, jerky and noisy operation of the motor is avoided. As was pointed out above, when the motor is operating under no-load, the contacts 25 and 33 will ordinarily remain open after their speed has been reached and the speed of the motor will be controlled by the contacts 26 and 34. When the motor is operating under load, however, the deceleration after the contacts 26 and 34 have opened will be so great that contacts 26 and 34 will close first and then contacts 25 and 33 will close. Thus, under load conditions, especially where the load is extremely heavy, the speed of the motor will be controlled by both sets of contacts; however, jerkiness and noise in the operation of the speed governor and the motor will be avoided in both instances.

The size of the wires and the number of turns in the field coils 43 and 44 will depend upon the size of the motor desired, the voltage of the source of electricity and other factors. It is preferred, however, that the first field coil 43 have a resistance considerably less than the resistance of the second field coil 44. For this reason, the first field coil 43 may be made of a wire that is larger in diameter than the diameter of the wire of the second field coil 44. For this same reason, a smaller number of turns may be used in the first coil 43 than is used in the second coil 44. It is preferred that both these conditions be present. In a typical embodiment where the motor was of one-half horse power operating on approximately 110 volts alternating current, the first field coil 43 employed 75 turns of No. 19 copper wire having a diameter of 0.036 inch and a resistance of 0.218 ohm per foot. The second field coil 44 was 125 turns of No. 28 copper wire having a diameter of 0.0126 inch and a resistance of 1.83 ohms per foot. The resistance ratio of coils 43 and 44 is thus approximately 1 to 14 so that when current is flowing through both coils a considerably greater amount of current will flow through coil 43 than through coil 44.

When both sets of contacts 25 and 33 and 26 and 34 are closed, the electrical current flows through the coils 43 and 44 in parallel. The motor acts as an ordinary series motor with rapid acceleration. When the first set of contacts 25 and 33 opens to break the circuit to the coil 43, all the current flows through the second coil 44 and the acceleration is slower as this arrangement provides a weak motor. Acceleration of the motor will continue, however, until contacts 26 and 34 open to break the electrical circuit to the armature 45. This is the predetermined maximum speed of the motor. Because of the arrangement of the light spring 35 on the contacts 25 and 33 and the heavy spring 36 on the contacts 26 and 34, the contacts 25 and 33 are the first to open and the last to close. The other contacts 26 and 34 are the last to open and the first to close.

In the speed control apparatus shown and described herein, the power output for a given torque is reduced when the speed of the motor increases beyond a predetermined speed that is less than the predetermined maximum speed. In the particular embodiment shown and described herein, the opening of the contacts 25 and 33 achieves this result by converting the motor from a strong to a weak motor. It is believed obvious that any other means could be employed. In this instance the predetermined speed is that speed where the contacts 25 and 33 are opened. The maximum predetermined speed is that speed at which the contacts 26 and 34 open. Both of these speeds may, of course, be varied by varying the position of the arms 27 and 30 by means of the control knob 41 which operates the cam member 39.

Having described my invention as related to the embodiment set out in the accompanying drawings, it is my intention that the invention be not limited by any of the details of description but rather be construed broadly within its spirit and scope as set out in the accompanying claims.

I claim:

1. In a series electric motor having a speed control including a movable speed responsive member and a pair of contacts operatively associated with said member for opening and closing the circuit to said motor at a predetermined speed, means for reducing the concentration of magnetic flux in said motor at a speed less than said predetermined speed, said reducing means comprising a pair of field coils about the armature of said motor and connected in the motor circuit in parallel with each other and means for opening the circuit through a selected one of said coils at said lesser speed, each of said field coils having field characteristics different from those of the other field coil.

2. The electric motor of claim 1 wherein said circuit opening means comprises a second pair of contacts arranged to open at said lesser speed.

3. The electric motor of claim 1 wherein said circuit opening means comprises a second pair of contacts operatively associated with said speed responsive member and arranged to open at said lesser speed.

4. The electric motor of claim 1 wherein said selected one field coil has a resistance that is considerably less than the resistance of the other field coil.

5. The electric motor of claim 1 wherein the number of turns of wire of said selected one field coil is less than the number of turns of wire of the other field coil.

6. The electric motor of claim 1 wherein the diameter of the wire of said selected one field coil is greater than the diameter of the wire of the other field coil.

7. The electric motor of claim 1 wherein said selected one field coil has a smaller number of turns and larger diameter wire than the turns and wire of the other field coil.

8. In a speed governor for a motor including a speed responsive member movable with respect to a portion of the motor, two pairs of contacts movable with respect to a portion of the motor, and means operatively connecting the movable member with one contact of each pair of contacts to open said contacts, one pair of contacts being arranged to open slightly before the other pair and at a lower speed as the speed increases toward a predetermined maximum controlled by said other pair of contacts, a first field coil about the armature of the motor and in series with said one pair of contacts and the armature of the motor, and a second field coil about the armature of the motor in parallel with the first field coil and in series with said other pair of contacts and said armature, each of said field coils having field characteristics different from those of the other field coil.

9. The speed governor of claim 8 wherein the number of turns of wire of said first field coil is less than the number of turns of wire of the second field coil.

10. The speed governor of claim 8 wherein the diameter of the wire of said first field coil is greater than the diameter of the wire of the second field coil.

11. The speed governor of claim 8 wherein the first field coil has a smaller number of turns and larger diameter wire than the turns and wire of the second field coil.

12. In a speed governor for a motor including a speed responsive member movable with respect to a portion of the motor, two pairs of contacts movable with respect to a portion of the motor, and means operatively connecting the movable member with one contact of each pair of contacts to open said contacts, one pair of contacts being arranged to open slightly before the other pair and at a lower speed as the speed increases toward a predetermined maximum controlled by said other pair of contacts, a first field coil about the armature of the motor and in series with said one pair of contacts and the armature of the motor, and a second field coil about the armature of the motor and in parallel with the first field coil and in series with said other pair of contacts and said armature, the first field coil having a smaller number of turns and larger diameter wire than the turns and wire of the second field coil and the wires of said pair of field coils being intimately associated with each other within the motor.

13. The speed governor of claim 12 wherein the motor is arranged to operate on substantially 110 volts, the first field coil comprises 75 turns of copper wire having a diameter of 0.036 inch and the second field coil comprises 125 turns of copper wire having a diameter of 0.0142 inch.

JOSEPH P. MAYER.

REFERENCES CITED

The following references are of record in the file of this patent:

UNITED STATES PATENTS

| Number | Name | Date |
|---|---|---|
| 789,377 | Newman | May 9, 1905 |
| 1,732,367 | Kleinschmidt | Oct. 22, 1929 |
| 2,356,166 | Lee, et al. | Aug. 22, 1944 |